(12) United States Patent
Greist, III et al.

(10) Patent No.: US 6,168,200 B1
(45) Date of Patent: Jan. 2, 2001

(54) DUAL LEVEL INFLATOR

(75) Inventors: Darton E. Greist, III; Scott Joseph DiGangi; Richard K. Robbins, all of Knoxville, TN (US)

(73) Assignee: Atlantic Research Corporation, Gainesville, VA (US)

( * ) Notice: Under 35 U.S.C. 154(b), the term of this patent shall be extended for 0 days.

(21) Appl. No.: 09/201,789

(22) Filed: Dec. 1, 1998

(51) Int. Cl.$^7$ .................................................. B60R 21/26
(52) U.S. Cl. ........................................... 280/736; 280/741
(58) Field of Search ..................................... 280/741, 736, 280/737; 102/530, 531

(56) References Cited

U.S. PATENT DOCUMENTS

| | | | |
|---|---|---|---|
| 3,773,353 | 11/1973 | Trowbridge et al. | 280/150 |
| 3,901,530 | 8/1975 | Radke | 280/150 |
| 3,905,515 | 9/1975 | Allemann | 222/3 |
| 4,213,635 | 7/1980 | Inokuchi et al. | 280/741 |
| 4,998,751 | 3/1991 | Paxton et al. | 280/741 |
| 5,067,744 | 11/1991 | Hirabayashi | 280/734 |
| 5,345,876 | 9/1994 | Rose et al. | 102/531 |
| 5,348,344 | 9/1994 | Blumenthal et al. | 280/737 |
| 5,501,487 * | 3/1996 | Trevillyan et al. | 280/736 |
| 5,558,367 | 9/1996 | Cuevas | 280/737 |
| 5,564,743 | 10/1996 | Marchant | 280/737 |
| 5,566,976 | 10/1996 | Cuevas | 280/737 |
| 5,582,428 | 12/1996 | Buchanan et al. | 280/741 |
| 5,593,180 | 1/1997 | Cuevas et al. | 280/741 |
| 5,628,528 | 5/1997 | DeSautelle et al. | 280/736 |
| 5,630,619 | 5/1997 | Buchanan et al. | 280/741 |
| 5,664,802 | 9/1997 | Harris et al. | 280/736 |
| 5,690,357 | 11/1997 | Cuevas | 280/736 |
| 6,010,152 * | 1/2000 | Swann et al. | 280/736 |
| 6,019,389 * | 2/2000 | Burgi et al. | 280/736 |

FOREIGN PATENT DOCUMENTS 0 800 965 A2   3/1997   (EP) .

* cited by examiner

Primary Examiner—Paul N. Dickson
Assistant Examiner—Faye M. Fleming
(74) Attorney, Agent, or Firm—Nixon & Vanderhye PC; Frank P. Presta

(57) ABSTRACT

A dual level inflator is provided for creating at least two different rates and levels of air bag inflation while optimizing cost effectiveness, size, safety and performance. The dual level inflator includes a unitized gas generator canister assembly including two canisters of gas generant material connected to a common base and positioned in a chamber formed in an inflator outer housing. The unitized assembly is easily transportable and mountable on the outer housing. Each canister of the unitized assembly includes apertures permitting direct communication between each canister cavity and the chamber of the outer housing. As a result, generant material positioned in each canister is directly exposed to the conditions in the outer housing chamber. The present assembly is advantageous in that it maximizes the internal volume available to the stored gas and, after the ignition of one canister and the inflation of the air bag, the remaining canister may be ignited without reinflating the air bag due to the previous depressurization of the chamber in combination with the selection of a generant material incapable of effectively burning in a low pressure environment, i.e. the directly connected chamber. The present dual inflator also includes seal means to prevent inadvertent ignition, and an arrangement by which the plurality of apertures formed in one canister are positioned relative to the apertures in the other canister to cause the gas flowing from one set of apertures to be sufficiently cooled by the inert gas in the chamber prior to reaching the apertures of the other canister thereby preventing inadvertent thermally induced ignition of the generant material in the remaining unfired canister.

16 Claims, 2 Drawing Sheets

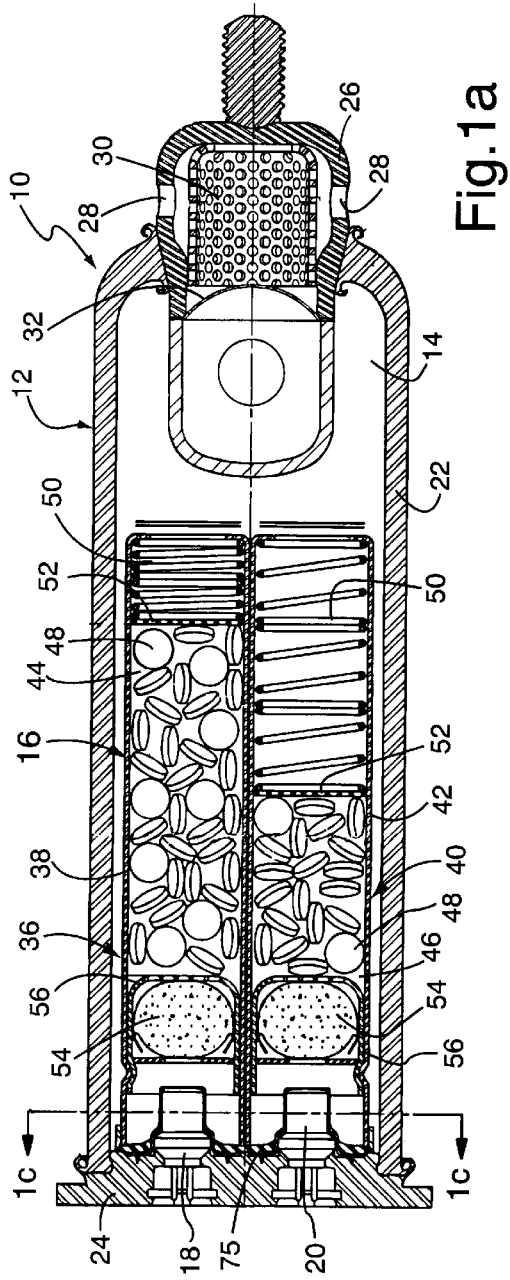
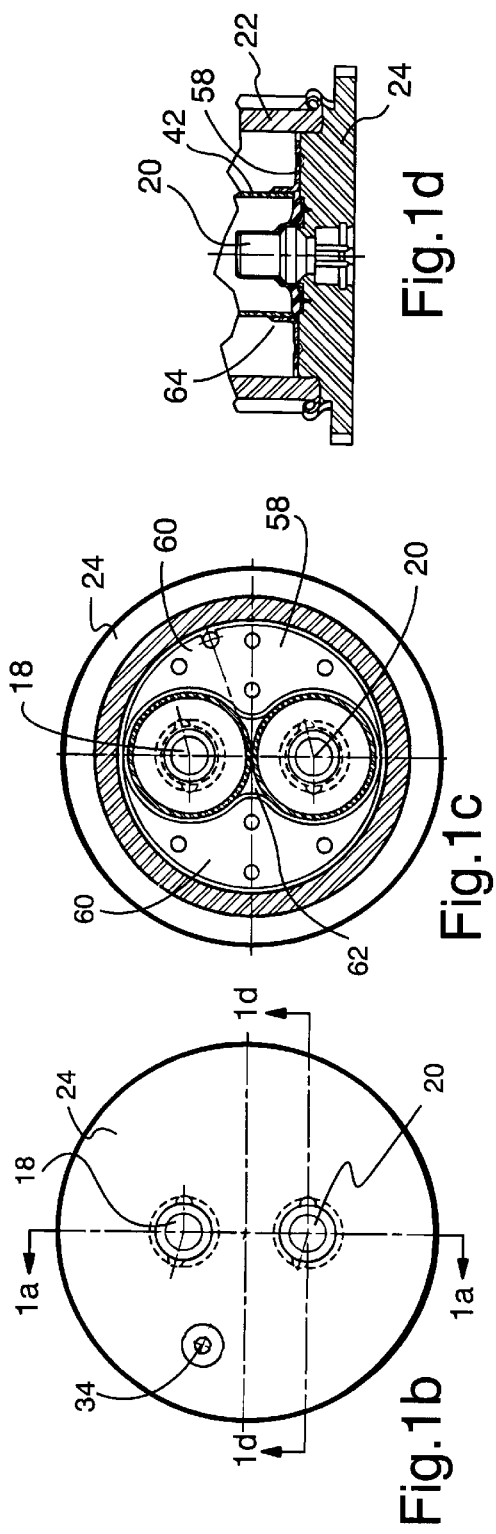

DUAL LEVEL INFLATOR

BACKGROUND OF THE INVENTION

1. Field of the Invention

The present invention relates generally to an inflator device including gas generators and more specifically to a dual level inflator which can selectively release gas at different rates and levels and thus enable an air bag or the like type of inflatable safety restraining device, to be deployed at different output levels in accordance with different sensor inputs.

2. Description of the Related Art

Recently, there has been a demand for controlling the rate and amount of inflation of safety devices such as air-bag restraint systems, in accordance with variables such as passenger size, position, seat belt usage and the velocity of the vehicle at time of collision.

In order to provide optimal occupant protection, different levels of output are required from the air bag inflator. For example, in a high speed collision with a large unbelted person, fill rapid inflation of the air bag is required to provide the best restraint. In lower speed crashes with smaller size occupants or even out-of-position occupants, a lower, slower rate of inflation is required so as not to inadvertedly injure the occupant but still provide enough inflation to provide restraint.

In order to achieve the two levels of inflation, it has been proposed in U.S. Pat. No. 3,773,353 to Trowbridge et al. to provide two separate charges and to ignite one in the event that a slow inflation is required and to ignite both in the event of a high speed collision, thus achieving the very rapid inflation and deployment of the air bag which is necessary under such circumstances. In this device the charges are arranged within a reservoir which is filled with a non-toxic gas under pressure. This housing is sealed by a burst plate that is punched out by a piston and rod type of arrangement when a first of the two charges is detonated. This arrangement however, suffers from the drawback of being relatively complex and therefore, relatively expensive. For example, no less than three burst plate arrangements are necessary. Also, the charges are each isolated from the reservoir and reservoir gas by an inner housing and a respective rupturable closure.

U.S. Pat. No. 3,905,515 to Allemann discloses another two-stage inflator assembly which utilizes two separate charges and which disposes the charge in a chamber which is used to store a non-noxious gas under pressure. However, this arrangement is even more complex than that in U.S. Pat. No. 3,773,353. In this arrangement a portion of the burst disc forms the head of a slidable shuttle valve member which is projectable into an exhaust passage to partially throttle the outflow of gases following a detonation of one or both of the two charges.

Another important concern in dual level inflator design is the disposability of the inflator assembly after use when, for example, the inflator assembly may be removed for disposal or the entire vehicle junked. In dual level devices, if one gas generator has been ignited, for example in reaction to a low speed collision, the other generator could remain ignitable, thereby posing a potential safety concern perhaps during removal or vehicle storage. If accidentally ignited, the second generator could produce hot high pressure gasses.

For this reason, it is preferred in the event of a scenario where only the first generator is deployed, the second generator also be deployed after the immediate impact but still within the crash event, e.g., up to 100 milliseconds after impact. In this case, it is important to provide as little output into the air bag as possible so that the bag will not reinflate and impact the occupant.

European Patent Publication No. 800965 to Buchanan discloses an inflator including a spherical housing forming a main chamber and two heating devices mounted in the main chamber. The heating devices are activated sequentially to achieve a wide range of performance. However, each heating device is covered with a barrier shell to isolate the device from the gas in the main chamber. As a result, the pressure in the heating device must rise to a level sufficient to rupture the barrier shell. Also, due to the nature of the gas generant typically used in inflators, the gas generant burns more rapidly under greater pressure causing increased heating and/or gas generation. If this inflator were operated in a dual mode and only one heating device activated corresponding to a low speed impact, intentional or inadvertent ignition of the remaining gas generator may be sufficient to reinflate the air bag.

Also, the heating devices are isolated from the stored gas thus wasting volume which might be occupied by the stored gas which could make the entire inflator smaller. U.S. Pat. Nos. 5,582,428 and 5,630,619 discloses other similar inflators. However, these inflators are unnecessarily complex with multiple burst disks and multiple containers and further are also likely cause reinflation of the air bag upon later ignition of an unused generator. Moreover, the devices disclosed in Trowbridge et al. and Allemann, discussed hereinabove, suffer drawbacks similar to the device disclosed in Buchanan.

Consequently, there is a need for a cost effective, compact, simple dual level inflator capable of permitting ignition of a second generator after ignition of a first generator without reinflation of a collapsed air bag so as to deactivate the unit for disposal.

SUMMARY OF THE INVENTION

It is an object of the present invention, therefore, to overcome the disadvantages of the prior art and to provide a cost effective yet safe dual level inflation device which effectively permits dual level performance.

A further object of the present invention is to provide a dual level inflator which permits ignition of one or both generators causing initial air bag inflation and subsequent ignition of a second generator in a scenario calling for the output of only one generator, without reinflation of the air bag.

It is a further object of the present invention to provide a dual level inflator including a unitary generator canister subassembly which maximizes internal volume available for the stored gas, is easily transportable, and simply attached to the inflator assembly.

Yet another object of the present invention is to provide a dual level inflator which improves safety to personnel after a vehicle accident, by permitting deactivation of the second generator within the crash event.

Another object of the present invention is to provide a dual level inflator which permits the gas generator loads at each level to be independently adjusted depending on system requirements thereby maximizing tailorability.

Still another object of the present invention is to provide a dual level inflator which minimizes the cost and size of the assembly.

These and other objects of the present invention are achieved by providing a dual level inflation device for inflating a vehicle safety restraint, comprising an outer housing including a chamber for containing a quantity of stored inert gas and an outlet for directing pressurized gas into the vehicle safety restraint, a first generator canister mounted in the chamber and including a first canister wall forming a cavity containing gas generant material and at least one aperture to permit open communication between the cavity and the chamber, and a second generator canister mounted in the chamber and including a second canister wall forming a cavity containing gas generant material and at least one second aperture to permit open communication between the cavity and the chamber. Importantly, the gas generant material in both the first generator canister and the second generator canister is exposed to the stored inert gas to prevent an undesired pressure increase in the respective cavity upon ignition of the generant material and to maximize the internal volume available to the stored gas, thus minimizing the overall size of the inflator. The dual level inflation device also includes at least one igniter for igniting the gas generant material in the first and second generator canisters. The gas generant material in at least one of the first and the second generator canisters is of a type incapable of burning effectively under low pressure. As a result, the unignited generant material in one of the generator canisters may be ignited subsequent to the ignition of the other generator canister without reinflating the associated vehicle safety restraint, i.e. air bag.

Preferably, each of the first and second generator canisters include a booster charge mounted in the cavity between the igniter and the generant material. The at least one first aperture and at least one second aperture preferably include a booster aperture positioned adjacent one of the booster charge and the at least one igniter. Preferably, each of the at least one first aperture and at least one second aperture includes a plurality of apertures extending longitudinally along the respective generator canister. The plurality of apertures may include two rows of apertures. The first generator canister may contain a first predetermined quantity of gas generant material while the second generator canister may contain a second predetermined quantity of material more or less than the first predetermined quantity.

The present invention is also directed to a dual level inflation device for inflating a vehicle safety restraint, comprising an outer housing including a chamber for containing a quantity of inert gas at a first predetermined pressure level and an outlet for directing pressurized gas into the vehicle safety restraint, a burst disk positioned to close the outlet and adapted to fail upon the pressure in the chamber reaching a second predetermined pressure level greater than the first predetermined pressure level, a first generator canister mounted in the chamber and including a cavity containing gas generant material and at least one first aperture formed in the canister to permit open communication between the cavity and the chamber, and a second generator canister mounted in the chamber and including a cavity containing gas generant material and at least one second aperture to permit open communication between the respective cavity and the chamber. The dual level inflation device also includes at least one igniter for igniting the generant material in the first and second generator canisters. Importantly, the dual level inflation device also includes an ignition prevention arrangement for preventing inadvertent ignition of the gas generant material in the second generator canister upon ignition and burning of the gas generant material in the first generator canister. The ignition prevention arrangement includes positioning the at least one first aperture and the at least one second aperture a sufficient distance apart to cause the gas flowing from the at least one first aperture to be sufficiently cooled by the inert gas in the chamber prior to reaching the at least one second aperture. In a preferred embodiment, each of the first and the second generator canisters includes a first side facing in a common first direction and a second side facing in a common second direction substantially opposite the first direction. The ignition prevention arrangement includes the at least one first aperture being positioned on the first side of the first generator canister while the second side of the first generator canister is free from apertures. The ignition prevention arrangement also includes the at least one second aperture being positioned on a second side of the second generator canister while the first side of the second generator canister is free from apertures. Also, there exists a seal between the two generators at the common base for preventing inadvertent ignition of the second generator.

The present invention is also directed to an inflation device for inflating a vehicle safety restraint, comprising an outer housing including a chamber for containing a quantity of stored inert gas and a unitized gas generator canister assembly mounted in the chamber and including a first generator canister containing a gas generant material, a second generator canister containing a gas generant material and positioned adjacent the first generator canister and a common base connected to a first end of both the first and second generator housings wherein the common base is connected to the outer housing. The inflation device also includes a first igniter positioned adjacent the common base at the first end of the first generator canister for igniting the gas generant material in the first generator canister and a second igniter positioned adjacent the common base at the first end of the second generator canister for igniting the gas generant material in the second generator canister. Preferably, each of the first and the second generator canisters are cylindrically shaped and the common base includes a mounting flange extending transversely outwardly from the first and second generator canisters upon two opposite sides of the unitized gas generator assembly. The outer housing is preferably generally circular in transverse cross section and the common base is positioned within the chamber of the outer housing. The outer housing may include an end cap mounted to close one end of the chamber and an outlet formed at an opposite end of the chamber so that a burst disk may be positioned to close the outlet and adapt it to fail upon the pressure in the chamber reaching a predetermined pressure level. Preferably, the first and the second igniters are mounted on the end cap. Also, each of the first generator canister and the second generator canister preferably includes a plurality of apertures exposing the gas generant material to the stored inert gas in the chamber to prevent an undesired pressure increase in the cavity upon ignition of the second gas generant material.

BRIEF DESCRIPTION OF THE DRAWINGS

FIG. 1a is a cross sectional view of the inflation device of the present invention including the unitized gas generator canister assembly of the present invention taken along plane 1a—1a in FIG. 1b;

FIG. 1b is an end view of one end of the inflation device of FIG. 1a showing the positioning of the igniters;

FIG. 1c is a cross sectional view of the inflation device of FIG. 1a taken along plane 1c—1c;

FIG. 1d is a partial cross section view of the inflation device of the present invention taken along plane 1d—1d in FIG 1b;

DETAILED DESCRIPTION OF THE PREFERRED EMBODIMENTS

Figure 2A:
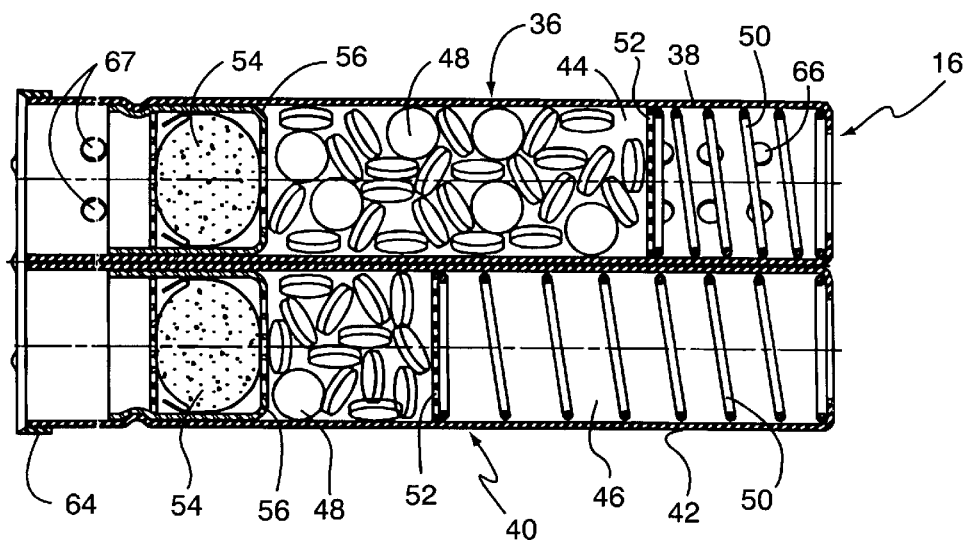
FIG. 2a is a cross sectional view of the unitized gas generator canister assembly of the present invention.

Referring to FIG. 1a, there is shown the dual level inflation device or inflator of the present invention, indicated generally at 10, which functions effectively and reliably to provide a high level and rate of inflation of a vehicle safety restraint, i.e. air bag, in the event, for example, of a high speed vehicle collision, or, alternatively, a low level and rate of air bag inflation in the event of a low speed collision. Dual level inflator 10 generally includes an outer housing 12 forming a chamber 14, a unitized gas generator canister assembly 16 positioned in chamber 14 and first and second igniters 18, 20 for initiating burning of generant material in unitized gas generator canister assembly 16.

As shown in FIGS. 1a–1c, outer housing 12 includes a generally cylindrically shaped housing portion 22, an end cap 24 mounted on one end of housing portion 22 so as to sealingly enclose chamber 14, and an outlet piece 26 mounted at an opposite end of housing portion 22. Outlet piece 26 extends into chamber 14 and includes outlet apertures 28 for directing gas from chamber 14 into an air bag (not shown). A diffuser 30 is mounted immediately upstream of outlet apertures 28 and a burst disk 32 mounted immediately upstream of diffuser 30. Burst disk 32 is adapted to fail under the application of a predetermined pressure thereby allowing pressurized gas to flow from chamber 14 through outlet apertures 28 into an air bag. After dual level inflator 10 is assembled, including installation of unitized gas generator canister 16 as discussed more fully hereinbelow, end cap 24 is hermetically sealed. A filling port 34 is provided in end cap 24 to facilitate the charging of chamber 14 with a selected non-toxic gas, such as argon or helium, under pressure.

As shown in FIGS. 1a, 1c and 2a–2c, unitized gas generator canister assembly 16 includes a first generator canister 36 formed by first canister wall 38 and a second generator canister 40 formed by a second canister wall 42. Both first and second generator canisters 36 and 40 are generally cylindrically shaped to form respective cavities 44 and 46. A generant material indicated at 48 is positioned in each cavity 44, 46 for generating gas upon ignition. In order to achieve the dual level performance, a sufficient quantity of gas generant material 48 is positioned in first generator canister 36 to allow inflation of an air bag at a reduced level and rate during, for example, a low speed collision, without the ignition and firing of second generator canister 40. Second generator canister 40 includes a quantity of gas generant material 48 which upon ignition with first generator canister 36, will, in combination, create a higher inflation level and rate desired during, for example, a high speed collision. Gas generant material 48 is held in position within the respective cavity 44, 46 by a bias spring 50 and spring plate 52. The first and second generator canisters 36, 40 each also include a booster charge 54 positioned in a booster housing 56 mounted at one end of each cavity adjacent first igniter 18 and second igniter 20. Booster charge 54 functions to provide more effective and reliable ignition of generant material 48 by igniters 18, 20.

Unitized gas generator canister assembly 16 is advantageously formed as an integral unitized assembly which can be easily transported prior to final assembly. Specifically, first and second generator canisters 36, 40 are mounted in abutment against one another and connected to a common base 58 as clearly shown in FIGS. 2a–2c. The size of unitized gas generator canister assembly 16 is minimized by forming common base 58 with a diameter substantially no greater than the outer combined width of first and second generator canisters 36 and 40. Common base 58 includes two mounting flanges 60 extending radially outward from a central opening 62 shaped to snugly receive one end of each of first and second generator canisters 36, 40. Common base 58 also includes a support ring 64 extending around central opening 62 for supporting, and providing a connection location for, first and second generator canisters 36, 40. First and second generator canisters 36, 40 may be connected to common base 58, and specifically support ring 64, by for example brazing or welding. As a result, the unitized gas generator canister assembly 16 is self-contained and highly compact while being easily transportable and attachable to outer housing 12.

As shown in FIGS. 1a, 1c and 1d, unitized gas generator assembly 16 is mounted in chamber 14 by connecting common base 5 to end cap 24 in any conventional manner. A seal 75 is mounted between the common base 58 and end cap 24 to further insure that there is no inadvertent ignition of the second generator. First and second igniters 18 and 20, respectively, are mounted on the inner portion of end cap 24 and extend into respective first and second generator canisters 36 and 40. The opposite side of first and second igniters 18 and 20 include connectors for connection to the appropriate electrical wiring for delivering ignition signals to the igniters.

Figures 2B, 2C:
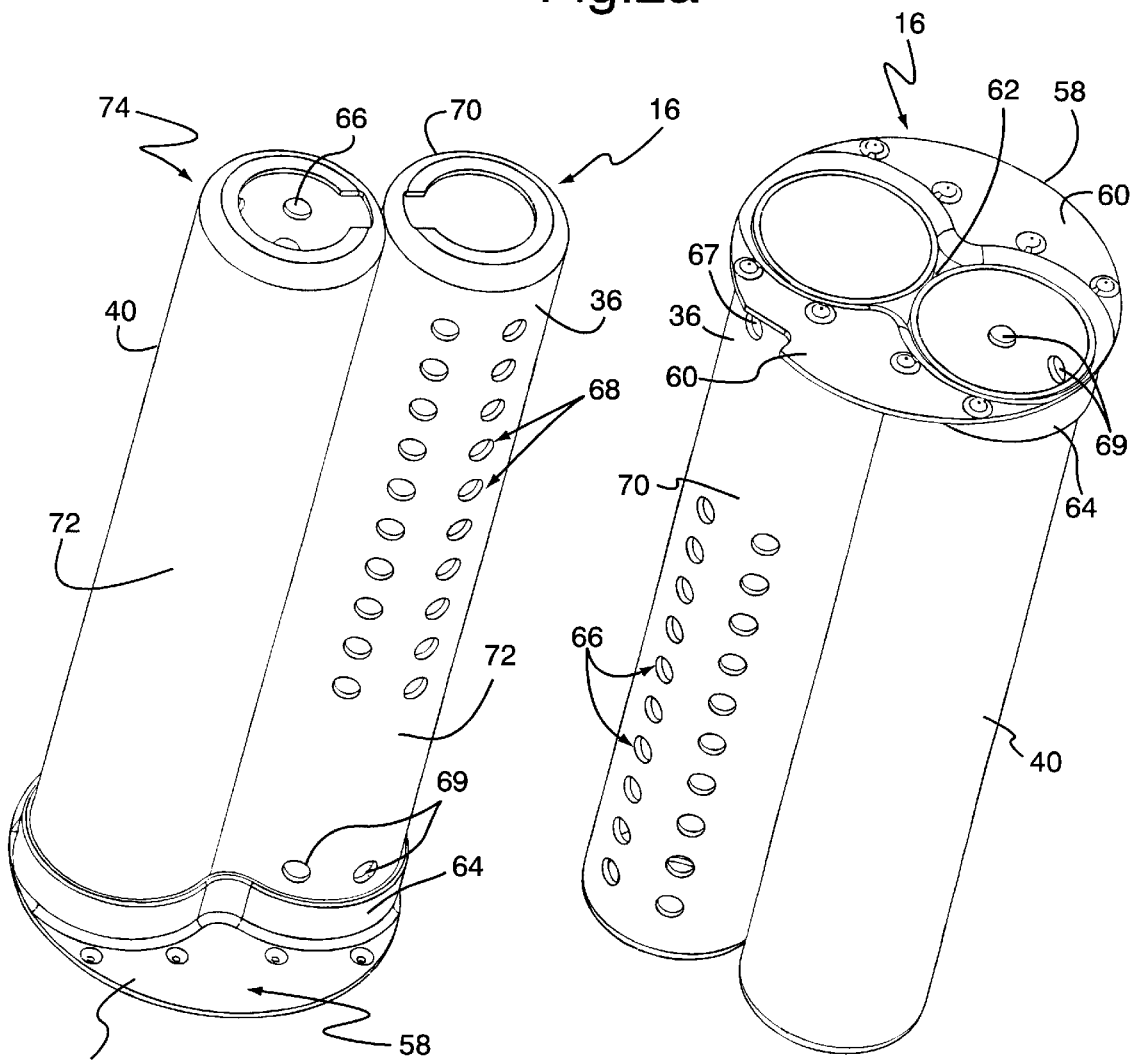
FIG. 2b is a perspective view showing one side of the unitized gas generator canister assembly of the present invention.
FIG. 2c is a perspective view of the unitized gas generator canister assembly in an inverted position showing an opposite side of the assembly.

First and second generator canisters 36 and 40 each include a plurality of apertures formed in the respective canister wall for allowing the respective cavity to communicate directly with chamber 14. Specifically, as shown in FIGS. 2b and 2c, first generator canister 36 includes a plurality of apertures 66 positioned on a first side 70 of unitized gas generator canister assembly 16 while second generator canister 40 includes a plurality of apertures 68 formed on a second side 72 of unitized generator canister assembly 16. In the preferred embodiment, as shown in FIGS. 2b and 2c, the first plurality of apertures 66 formed in first generator canister 36 include two rows of apertures extending longitudinally along canister 36. Plurality of apertures 66 also include a pair of booster apertures 67 for controlling the pressure from booster charge 54. Likewise, plurality of apertures 68 include two rows of apertures extending longitudinally along the second side of the second generator canister 40 including booster apertures 69.

Importantly, the plurality of apertures 66 and 68 directly expose the generant material in first and second generator canisters 36, 40 respectively, to the conditions present in chamber 14. The generant material 48 positioned in first and second generator canisters 36 and 40 does not include any other casing, sheath or wrapping between the generant material and the canister walls which would cause pressure to build up in the respective cavity of the canisters during both initial and continued igniting and burning of both the boost and generant material. Importantly, this design permits the second generator canister 40 to be ignited subsequent to a predetermined time after the ignition of first generator canister 36 without reinflation of the air bag. For example, during a low speed collision, first generator canister 36 will be ignited causing further pressurization of chamber 14 by the hot gas generated by first generator canister 36. As gas generant material 48 burns, the gas is immediately released through the plurality of apertures 66 into chamber 14 causing a pressure increase in chamber 14 due to an increased quantity of gas and an increase in temperature. At a predetermined increased pressure level, burst disk 32 will fail causing the gas in chamber 14 to flow through outlet apertures 28 into the air bag. Subsequently, it is desirable to ignite second generator canister 40 for safety purposes to prevent inadvertent ignition and injury to personnel. This second ignition should occur without reinflation of the air bag. The dual level inflator 10 of the present invention permits second generator canister 40 to be ignited without reinflation of the air bag for two specific reasons. First, the gas generant material 48 in both first and second generator canisters 36, 40 is directly exposed to chamber 14. As a result, when second generator canister 40 is ignited by a second igniter 20, chamber 14 has essentially been depressurized (at approximately 100 milliseconds after initial deployment). The gas generated by second generator canister 40 in combination with an already depressurized volume of gas in chamber 14 is simply insufficient to reinflate the air bag. Secondly, gas generant material 48 is of the type which is incapable of burning effectively, i.e. generating gas at a high rate, in a low pressure environment. Since the initial gas generated by gas generant material 48 is not contained due to the plurality of apertures and is further released into a low pressure chamber 14, the gas generant material in second generator canister 40 simply fails to generate a sufficient volume of gas necessary to reinflate the air bag. For example, gas generant material 48 may be the type of material described in U.S. Pat. No. 5,726,382, the entire contents of which is hereby incorporated by reference.

Dual level inflation device 10 also includes an ignition prevention arrangement for preventing inadvertent ignition of the generant material in second generator canister 40 upon ignition and burning of the generant material 48 in first generator canister 36. During ignition of first generator canister 36, the gas generated by the burning of generant material 48 exists at a very high temperature. This high temperature gas flows through plurality of apertures 66 into chamber 14 and mixes with the inert gas in chamber 14. It has been found that the high temperature gas from first generator canister 36 may cause temperature induced ignition of the gas generant material 48 in second generator canister 40. However, the present ignition prevention arrangement 74 prevents this temperature induced ignition of the gas generant material 48 in second generator canister 40 by creating a long flow path between the plurality of apertures 66 formed in first generator canister 36 and the plurality of apertures 68 formed in second generator canister 40. Specifically, the ignition prevention arrangement includes positioning the plurality of apertures 66 in first generator canister 36 a sufficient distance around the peripheral extent of the unitized gas generator canister assembly 16 from the plurality of apertures 68 formed in second generator canister 40 to cause the gas flowing from the plurality of apertures 66 to be sufficiently cooled by the inert gas in chamber 14 prior to reaching the plurality of apertures 68 formed in second generator canister 40.

In the preferred embodiment, as shown in FIGS, 2b and 2c, the plurality of apertures 66 are formed on first side 70 of first generator canister 36 while the second side 72 of canister 36 contains no apertures. On the other hand, the plurality of apertures 68 are formed in the second side of second generator canister 40 facing in an opposite direction from the plurality of apertures 66 while the first side 70 of second generator canister 40 is free from any apertures. Thus, gas flowing from the plurality of apertures 66 must flow completely around the peripheral extent, or the distal end, of unitized gas generator canister assembly 16 before entering the plurality of apertures 68. As a result, the ignition prevention arrangement 74 of the present invention creates a long cooling path for the hot gas to flow through before reaching the apertures of the remaining canister thereby allowing the cooler inert gas in chamber 14 to cool the hot gas generated by first generator canister 36 to a lower temperature incapable of causing thermal induced ignition of the generant material 48 in second generator canister 40. In addition, the seal 75 mounted between the common base 58 and end cap 24 prevents hot gas flow from the first generator into the second generator. This further insures against inadvertent ignition of the second generator. As a result, this arrangement creates a safer, more reliable dual level inflator device 10. Of course, the plurality of apertures 66 and the plurality of apertures 68 may be formed at other locations on the respective canisters so long as the distance between the apertures is sufficient to permit adequate cooling of the high temperature gas to prevent inadvertent thermally induced ignition of the unfired canister.

We claim:

1. An inflation device for inflating a vehicle safety restraint, comprising:

an outer housing including a chamber for containing a quantity of stored inert gas;

a unitized gas generator canister assembly mounted in said chamber and including a first generator canister containing a gas generant material, a second generator canister containing a gas generant material and positioned adjacent said first generator canister, and a common base connected to a first end of both said first and said second generator housings, said common base connected to said outer housing;

a first ignitor positioned adjacent said common base at said first end of said first generator canister for igniting said gas generant material in said first generator canister; and a second ignitor positioned adjacent said common base at said first end of said second generator canister for igniting said gas generant material in said second generator canister;

each of said first generator canister and said second generator canister including a plurality of apertures exposing said generant material to the stored inert gas in said chamber to prevent an undesired pressure increase upon ignition of said gas generant material; and ignition prevention means for preventing inadvertent ignition of said gas oenerant material in said second generator canister upon ignition and burning of said gas generant material in said first generator canister, said ignition prevention means including positioning said plurality of apertures in said first generator canister a sufficient distance from said plurality of apertures in said second generator canister to cause the gas flowing from said plurality of apertures of said first generator canister to be sufficiently cooled by the inert gas in said chamber prior to reaching said plurality of apertures of said second generator canister;

each of said first and said second generator canisters including a first side facing in a common first direction and a second side facing in a common second direction substantially opposite from said first direction, said plurality of apertures in said first generator canister being positioned on said first side thereof, said second side of said first generator canister being free from apertures, said plurality of apertures in said second generator canister being positioned on said second side thereof, said first side of said second generator canister being free from apertures.

2. The inflation device of claim 1, wherein each of said first and said second generator canisters are substantially cylindrically shaped, said common base including a mounting flange extending transversely outwardly from said first and said second generator canisters on two opposite sides of said unitized gas generator assembly, and said first and second generator canisters being disposed in abutting relation.

3. The inflation device of claim 1, wherein said outer housing includes a generally circular transverse cross-section, said common base being positioned within said chamber of said outer housing.

4. The inflation device of claim 1, wherein said outer housing includes an end cap mounted to close one end of said chamber and an outlet formed at an opposite end of said chamber, further including a burst disk positioned to close said outlet and adapted to fail upon the pressure in said chamber reaching a predetermined pressure level.

5. The inflation device of claim 4, wherein said first and said second igniters are mounted on said end cap.

6. The inflation device of claim 1 further comprising seal means between said first generator and said second generator to prevent hot gas from flowing therebetween.

7. A dual level inflation device for inflating a vehicle safety restraint, comprising:
   an outer housing including a chamber for containing a quantity of stored inert gas and an outlet for directing pressurized gas into the vehicle safety restraint;
   a first generator canister mounted in said chamber, said first generator canister including a first canister wall forming a cavity containing gas generant material and at least one first aperture formed in said first canister wall to permit open communication between said cavity and said chamber, said gas generant material in said first generator canister exposed to the stored inert gas to prevent an undesired pressure increase in said cavity upon ignition of said generant material;
   a second generator canister mounted in said chamber, said second generator canister including a second canister wall forming a cavity containing gas generant material and at least one second aperture formed in said second canister wall to permit open communication between said cavity and said chamber, said gas generant material in said second generator canister exposed to the stored inert gas to prevent an undesired pressure increase in said cavity upon ignition of said generant material; and
   at least one igniter for igniting said generant material in said first and said second generator canisters;
   ignition prevention means for preventing inadvertent ignition of said generant material in said second generator canister upon ignition and burning of said generant material in said first generator canister, said ignition prevention means including positioning said at least one first aperture a sufficient distance from said at least one second aperture to cause the gas flowing from said at least one first aperture to be sufficiently cooled by the inert gas in said chamber prior to reaching said at least one second aperture;
   said first and said second generator canisters including a first side facing in a common first direction and a second side facing in a common second direction substantially opposite from said first direction, said ignition prevention means including said at least one first aperture being positioned on said first side of said first generator canister, said second side of said first generator canister being free from apertures, said at least one second aperture being positioned on said second side of said second generator canister, and said first side of said second generator canister being free from apertures.

8. The inflation device of claim 7, wherein said gas generant material in at least one of said first and said second generator canisters is of a type incapable of burning effectively under low pressure.

9. The inflation device of claim 8, wherein each of said first and said second generator canisters include a booster charge mounted in said cavity between said at least one ignitor and said gas generant material, each of said at least one first aperture and said at least one second aperture including a booster aperture positioned adjacent one of said booster charge and said at least one ignitor.

10. The inflation device of claim 9, wherein each of said at least one first aperture and said at least one second aperture includes a plurality of apertures extending substantially longitudinally along said first and said second generator canisters.

11. The inflation device of claim 10, wherein said plurality of apertures includes two rows of apertures.

12. The inflation device of claim 8, wherein said first generator canister contains a first predetermined quantity of gas generant material and said second generator canister contains a second predetermined quantity of gas generant material less than said first predetermined quantity.

13. A dual level inflation device for inflating a vehicle safety restraint, comprising:
   an outer housing including a chamber for containing a quantity of inert gas at a first predetermined pressure level and an outlet for directing pressurized gas into the vehicle safety restraint;
   a burst disk positioned to close said outlet and adapted to fail upon the pressure in said chamber reaching a second predetermined pressure level greater than said first predetermined pressure level;
   a first generator canister mounted in said chamber and including a cavity containing gas generant material and at least one first aperture formed in said first generator canister to permit open communication between said cavity and said chamber;
   a second generator canister mounted in said chamber and including a cavity containing gas generant material and at least one second aperture formed in said second generator canister to permit open communication between said cavity and said chamber;
   at least one igniter for igniting said generant material in said first and said second generator canisters;
   an ignition prevention means for preventing inadvertent ignition of said gas generant material in said second generator canister upon ignition and burning of said gas generant material in said first generator canister, said ignition prevention means including positioning said at least one first aperture a sufficient distance from said at least one second aperture to cause the gas flowing from said at least one first aperture to be sufficiently cooled by the inert gas in said chamber prior to reaching said at least one second aperture;

each of said first and said second generator canisters including a first side facing in a common first direction and a second side facing in a common second direction substantially opposite from said first direction, said ignition prevention means including said at least one first aperture being positioned on said first side of said first generator canister, said second side of said first generator canister being free from apertures, said at least one second aperture being positioned on said second side of said second generator canister, and said first side of said second generator canister being free from apertures.

14. The inflation device of claim 13, wherein said outer housing includes an end cap mounted to close one end of said chamber and an outlet formed at an opposite end of said chamber, further including a burst disk positioned to close said outlet and adapted to fail upon the pressure in said chamber reaching a predetermined pressure level.

15. The inflation device of claim 13, wherein said at least one igniter includes a first ignitor mounted on said end cap adjacent one end of said first generator canister for igniting said generant material in said first generator canister and a second ignitor mounted on said end cap adjacent one end of said second generator canister for igniting said generant material in said second generator canister.

16. The inflation device of claim 13, wherein said gas generant material in said first generator and said second generator canisters are continually exposed to the stored inert gas to prevent an undesired pressure increase in said respective cavity upon ignition of said generant material, each of said at least one first aperture and said at least one second aperture includes a plurality of apertures extending substantially longitudinally along said first and said second generator canisters, wherein said gas generant material in at least one of said first and said second generator canisters is of a type incapable of burning effectively under low pressure.

* * * * *